Jan. 9, 1951 E. ROSE 2,537,859
DRILL JIG

Filed May 21, 1946 3 Sheets-Sheet 1

INVENTOR.
EUGENE ROSE
BY Victor J. Evans & Co.
ATTORNEYS

Jan. 9, 1951   E. ROSE   2,537,859
DRILL JIG
Filed May 21, 1946   3 Sheets-Sheet 2

*INVENTOR.*
EUGENE ROSE
BY *Victor J. Evans & Co.*
ATTORNEYS

Jan. 9, 1951  E. ROSE  2,537,859
DRILL JIG
Filed May 21, 1946   3 Sheets-Sheet 3
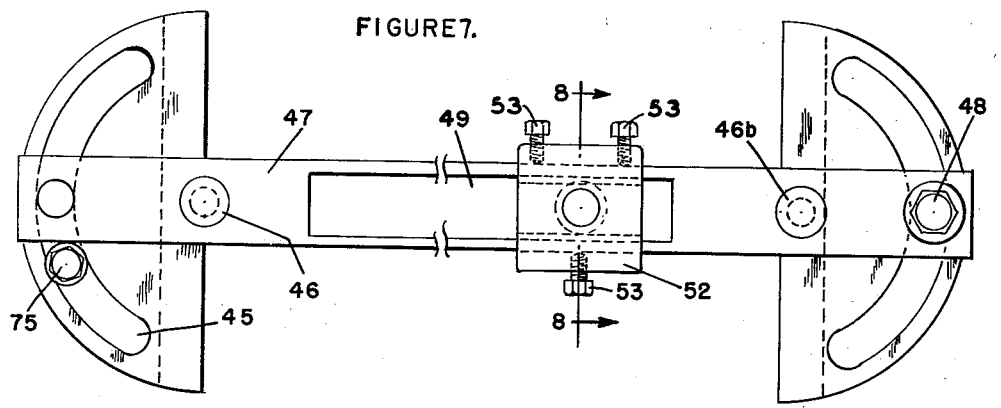
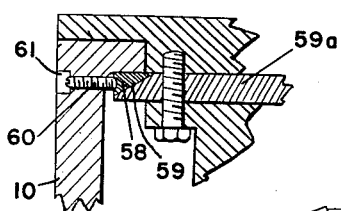
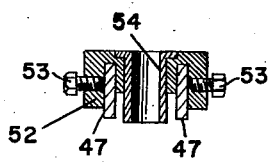
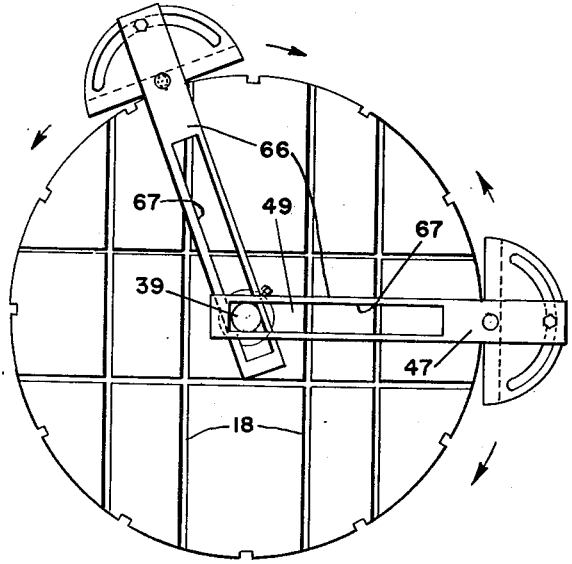
INVENTOR.
EUGENE ROSE
BY *Victor J. Evans & Co.*
ATTORNEYS Patented Jan. 9, 1951

2,537,859

UNITED STATES PATENT OFFICE 2,537,859

DRILL JIG

Eugene Rose, Clendenin, W. Va.

Application May 21, 1946, Serial No. 671,239

1 Claim. (Cl. 77—64)

The invention relates to a jig indexing assembly, and more especially to an adjustable indexing assembly for drilling, punching and milling machine production shop work.

The primary object of the invention is the provision of an assembly of this character, wherein accuracy is assured through the use thereof when associated with a drill press, punch machine, milling machine, or other shop machinery, without requiring layout methods, in the handling of the work, as now commonly resorted to, for the execution of a job, the assembly being of novel construction, and unique in the arrangement of adjuncts thereof.

Another object of the invention is the provision of an assembly of this character, wherein it is susceptible of universal adjustment, which is carried forth with ease and dispatch, as well as accuracy in the finished work, the assembly being compact and involved a minimum number of parts parts, thus economical in repairs and replacements.

A further object of the invention is the provision of an assembly of this character, which is simple in construction, thoroughly reliable and efficient in operation, strong, durable, susceptible of various adaptations and adjustments, readily and easily adjusted, with a maximum range thereto, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and point out in the claim hereunto appended.

In the accompanying drawings:

Figure 7 is an enlarged plan view of a drill guide support.

Figure 8 is a sectional view taken on the line 8—8 of Figure 7 looking in the direction of the arrows.

Figure 9 is a view similar to Figure 4 showing a further modification of lock.

Figure 10 is a plan view similar to Figure 1 showing a modification of a drill guide support over that shown in said Figure 1.

Similar reference characters indicate corresponding parts throughout the several views in the drawings.

Figure 2:
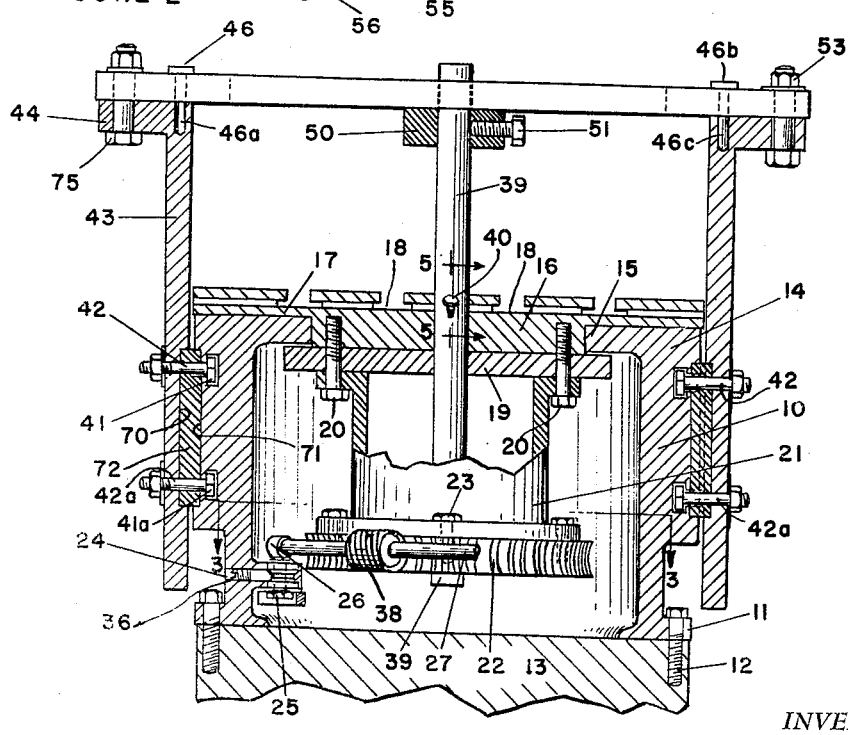
Figure 2 is a side view, partly broken away, of the assembly constructed in accordance with the invention.
Figure 3:
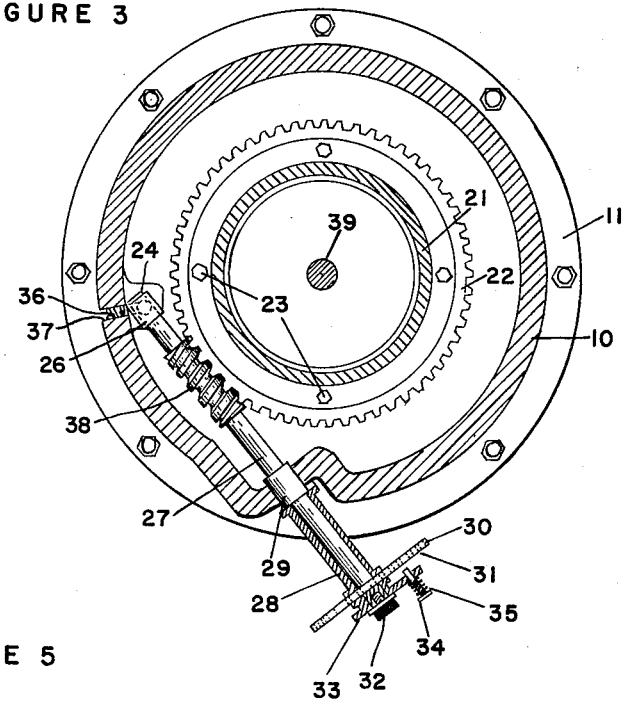
Figure 3 is a sectional view taken on the line 3—3 of Figure 2 looking in the direction of the arrows.

Referring to the drawings in detail, the assembly constituting the present invention comprises a vertical columnar or cylindrical table stand or base body 10, which can be of any desirable height, having an externally flanged bottom rim 11 secured by fasteners 12 in an anchored position upon a bench or other foundation, a portion being indicated at 13, in Figure 2. The stand or body 10 at its flat top area 14 has formed centrally therein a circular opening 15, in which is counterseated the central solid hub formation 16 of a rotary turn table 17 of flat disk or circular contour, which is of the same or approximate diameter of the area 14, as appears in Figure 2 of the drawings.

The table 17 in its top face has formed therein criss-crossed rows of spaced inverted substantially T-shaped channels or grooves 18 for the adjustable fitting and clamping therein, under selectivity, work holders, not shown, for a piece of work, also not shown, to hold the work to be operated on, this being a common expedient in drill presses, milling machines or the like.

The hub formation 16 has fitted to its under face a disk-like retaining plate 19, which is detachably secured in place by fasteners 20, to hold the table rotatably fitted to the stand or body 10, as will be obvious. The fasteners 20 detachably secure to this plate 19 an underslung centrally located cylindrical turning post 21, which is confined within the said stand or body 10, and has fitted to its flanged lower end a ring worm gear 22, this being detachably secured by fasteners 23.

At a selected point internally of the stand or body 10, in proximity to the gear 22 is an ear 24 in which is rotatably fitted an eccentric bearing 25 having a wrist pin 26. The wrist pin 26 providing a pivot for the inner end of a worm-threaded feed shaft 27 which has its outer end extended through a suitable clearance 29 in the stand or body 10. The outer end of the shaft 27 is revolubly fitted within a sleeve bearing 28 which has rocking support in the clearance 29 for the outer end of said shaft, and is devoid of rotation with the latter. The sleeve bearing 28 at its outer end is provided with an index dial 30, and the index dial 30 has indexing holes 31 therein spaced from each other and arranged in concentric rows. On the outer extremity of the shaft 27 and attached thereto for radial adjustment by a screw fastener 32 is a setting arm 33, and the arm 33 carries a spring tensioned latching pin 34. A barrel 35 provides a housing for the pin 34 so that a cranking handle is provided, whereby the shaft 27 can be manually rotated in order to adjust the table 17 so that work can be set thereon in conformity with regulation or adjustment of the latch pin on the index dial 30.

The eccentric bearing 25 is held in a fixed position in the ear 24 by a set screw 36, and the set screw 36 is accessible through a slot 37 in the stand or body 10. The purpose of the bearing 25 is to permit regulation of the position of the shaft 27 and its worm thread 38 relative to the threads of the ring gear 22, according to the diameter of the ring gear. Thus, the ring gear 22 can be replaced by other gears conforming with the adjustment indexing between the table 17 and the dial 30, respectively, so as to insure accuracy of setting of the work that is to be operated upon in a drilling machine, punch, milling machine, or the like.

Figure 5:
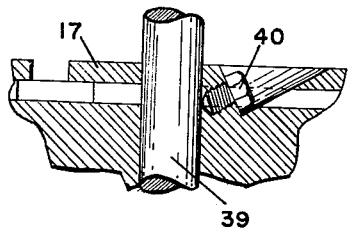
Figure 5 is a fragmentary sectional view taken in the line 5—5 of Figure 2 looking in the direction of the arrows.

Centered within the post 21 and table 17 is a vertically disposed arbor 39, and the arbor 39 adjustably projects above the table 17 and is secured thereto by a set screw 40, Figure 5, so that the arbor can rotate with the table.

Formed in the stand or body 10 at the external periphery thereof are annular upper and lower guide grooves 41 and 41a which adjustably receive therein fasteners 42 and 42a. The fasteners 42 and 42a serve to connect mounting brackets 43 to the body 10. The brackets 43 are provided on their upper ends with outturned ends or horizontally disposed heads 44 that are of segmental shape. Each of the heads 44 is provided with an arcuately-shaped slot 45. Centrally positioned with respect to the slots 45 are dowel pins 46 and 46b which are removably mounted in openings 46a and 46c in the upper ends of the brackets 43. A gauge or guide bar 47 is provided, and the bar 47 can be set at any horizontal angle traversing the plane of the table 17 and in parallelism with its top face. To set the guide bar 47, the pin 46 is removed, and the clamping bolt 48 is loosened, and then the bar 47 is moved out of engagement with the arbor 39, whereby the bar 47 can be pivoted upon the pin 46b. A lock bolt 75 is provided to act as a stop and guide when returning the bar 47 to its original position. The bar 47 is provided with a longitudinally extending slot 49 which accommodates the arbor 39 when the arbor projects through the slots. An adjustable collar 50 is held in place on the arbor 39 by a set screw 51, the collar 50 being arranged below the bar 47, Figure 2, the collar functioning as a central support for the bar when the parts are in the position shown in Figure 1.

The set screw 40 holds the arbor in the hub 16 of the table 17, and by loosening the set screw the arbor may be lowered until the upper end is below the guide bar 47. With the pin 46 removed, the guide bar may then be moved to either side to facilitate positioning and clamping work, such as a gear or other device, on and to the turntable. When the work is bolted or clamped in position, the guide bar 47 is returned to the position shown in Figure 1, and the arbor is raised until the upper end thereof extends through the slots 49. The runner 52 may then be slid along the bar 47 to position the drill guide in relation to the work. The bar 47 can be locked in its adjusted position by means of a clamping bolt 48 which projects into the slots 45 in the upper end of one of the brackets 43. Seated on the bar 47 is an adjustable runner 52. The runner 52 is maintained immobile in its adjusted position on the bar 47 by set screws 53, and the runner 52 carries a drill bit or punch guide 54 which is changeable in order to accommodate various sizes of bits or punches to be used in the assembly.

Figure 1:
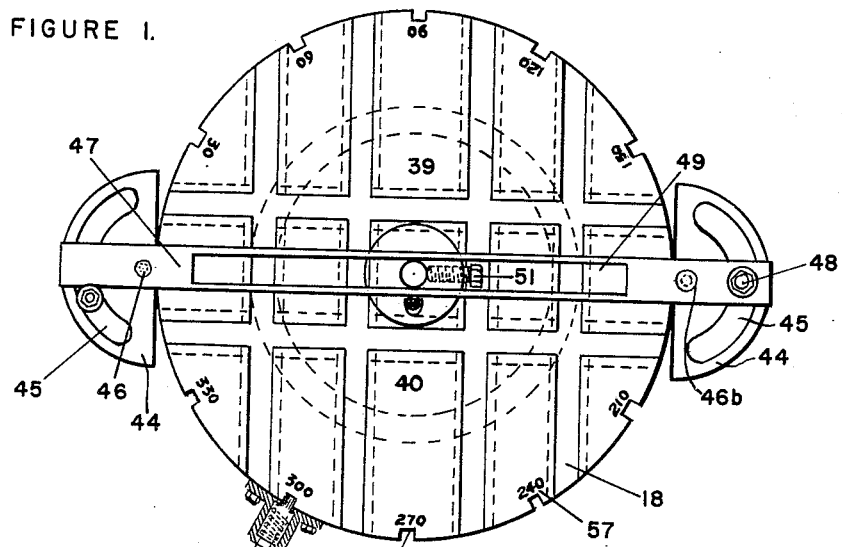
Figure 1 is a top plan view of the rotary table of the assembly.

In Figure 1 of the drawings, the table 17 at its outer periphery is provided with a plurality of index notches 55 which are arranged at 30-degree angles with respect to each other, and the notches 55 are adapted to be selectively engaged by a spring tensioned locking pin 56, the pin 56 being carried by the stand or body 10. In this manner, the table 17 can be held in a selected position under guidance of the scale markings 57 which appear at the margin of the table. Thus, the piece of work can be quickly located in proper position on the table for drilling, punching or milling operations with accuracy whenever standard, 30-degree, 60-degree and 90-degree separations are required.

Figure 4:
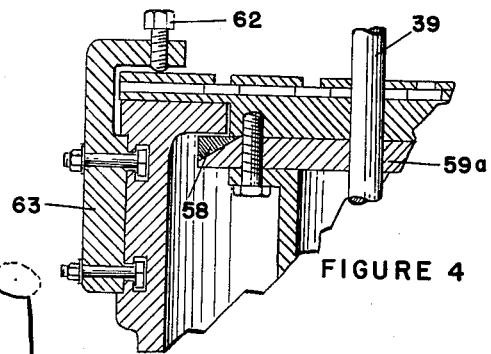
Figure 4 is a fragmentary vertical sectional view showing a slight modification of the rotary table lock.

In Figures 4 and 9 of the drawings there is shown a slight modification, wherein the table 17 is locked in an adjusted position on the stand or body 10. This locking means embodies a wedge key 58 which is arranged within the body 10, and the wedge key 58 coacts with an outer peripheral wedging edge 59 of a plate 59a, the plate 59a being substituted for the retaining plate 19. The key 58 is actuated by an adjusting screw 60 which is accessible to a clearance 61.

In Figure 4 of the drawings there is shown a further modification, wherein the table can be locked in adjusted position by a set screw 62, the set screw 62 being mounted on a bracket 63 and the table and bracket of Figure 4 can be clamped in adjusted position in the stand or body 10 by means of the set screw 62.

Figure 6:
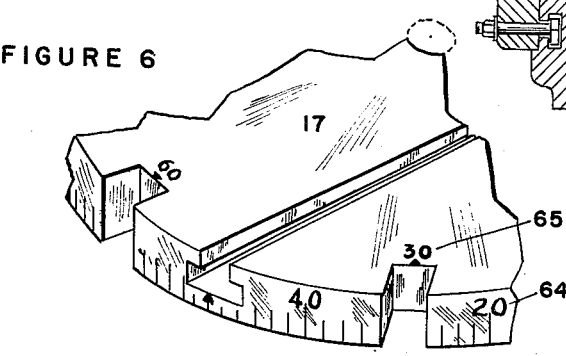
Figure 6 is a fragmentary perspective view of the table plate, showing a variance in the index marking thereof from that shown in Figure 1.

In Figure 6 of the drawings there is shown another modified arrangement, wherein the table is provided with several index scale markings 64 and 65 for the convenience of an operator of the assembly, these markings being a substitute for the scale markings heretofore described.

In Figure 10 of the drawings there is shown a still further modification wherein the gauge bar involves two sections 66, each of the sections 66 being slotted at 67 and the mounting of the sections 66 is identical to the mounting of the bar 47. Thus, the sections 66 can be adjusted toward and away from each other in accordance with the layout of the work to be operated upon by a machine with which the assembly may be associated.

It should be seen that the work on the table 17 can be rotated within definite limits under the adjustment setting or indexing of the assembly so that this work can be drilled, punched or milled with accuracy in association of this assembly with such types of machines.

What is claimed is:

In a drill jig, a vertically disposed base body provided with a bottom rim adapted to be secured to a supporting body, a turntable rotatably supported by said base body, there being a pair of spaced parallel horizontally disposed annular guide grooves arranged in the exterior surface of said base body, a pair of vertically disposed brackets arranged contiguous to the outer surface of said base body, horizontally disposed fastening elements projecting through said brackets and slidably engaging said guide grooves, the upper end of each of said brackets being shaped to define a horizontally disposed head, there being an arcuate slot arranged in each of said heads, there being an opening in each of said heads, a guide bar extending between said heads and supported by the latter, a pair of dowel pins projecting through said guide bar and having their lower ends engaging the openings in said heads, a securing element projecting through one end of said guide bar and into the arcuate slot in one of said heads for maintaining the guide bar immobile in its adjusted position, a runner adjustably mounted for longitudinal movement along said guide bar, and securing elements projecting through said runner and into engagement with said guide bar for maintaining said runner immobile in its adjusted position.

EUGENE ROSE.

REFERENCES CITED

The following references are of record in the file of this patent:

UNITED STATES PATENTS

| Number | Name | Date |
|---|---|---|
| 175,416 | Bustin | Mar. 28, 1876 |
| 292,927 | Lipe | Feb. 5, 1884 |
| 511,736 | Libby | Dec. 26, 1893 |
| 612,412 | Grohmann | Oct. 18, 1898 |
| 1,256,794 | Hanton | Feb. 19, 1918 |
| 1,834,389 | Drescher | Dec. 1, 1931 |
| 1,946,835 | Buhr | Feb. 13, 1934 |
| 2,029,650 | Betz | Feb. 4, 1936 |
| 2,030,339 | Weightman | Feb. 11, 1936 |
| 2,057,516 | Favre | Oct. 13, 1936 |
| 2,268,078 | McCurdy | Dec. 30, 1941 |
| 2,342,539 | Gorton | Feb. 22, 1944 |
| 2,351,246 | Walling | June 13, 1944 |
| 2,369,425 | Becker | Feb. 13, 1945 |
| 2,388,320 | Gardiner | Nov. 6, 1945 |
| 2,413,677 | Beitz | Jan. 7, 1947 |

FOREIGN PATENTS

| Number | Country | Date |
|---|---|---|
| 18,055 | Great Britain | Aug. 27, 1908 |
| 408,394 | Great Britain | 1934 |